United States Patent [19]
Kim

[11] Patent Number: 5,847,921
[45] Date of Patent: Dec. 8, 1998

[54] BUS BAR INSULATION APPARATUS FOR ELECTRIC POWER DISTRIBUTION

[75] Inventor: Ki Bum Kim, Chungju, Rep. of Korea

[73] Assignee: LG Industrial Systems Co., Ltd., Seoul, Rep. of Korea

[21] Appl. No.: 962,702

[22] Filed: Nov. 3, 1997

[30] Foreign Application Priority Data

Nov. 8, 1996 [KR] Rep. of Korea .................. 1996-52811

[51] Int. Cl.⁶ ..................................................... H02B 1/04
[52] U.S. Cl. ........................ 361/634; 174/149 B; 361/637
[58] Field of Search ............................... 174/72 B, 71 B, 174/149 B; 361/622, 627, 634, 644, 648–652, 760

[56] References Cited

U.S. PATENT DOCUMENTS

| | | | |
|---|---|---|---|
| 4,636,915 | 1/1987 | Perkins et al. .......................... | 361/637 |
| 4,916,574 | 4/1990 | Hancock et al. ........................ | 361/644 |
| 5,046,173 | 9/1991 | Wall, Jr. .................................. | 361/634 |
| 5,295,042 | 3/1994 | Midgley et al. ........................ | 361/634 |

*Primary Examiner*—Gregory D. Thompson
*Attorney, Agent, or Firm*—Oliff & Berridge, PLC

[57] ABSTRACT

A bus bar insulation apparatus for a power distributor which is capable of effectively insulating the diverged circuit breakers of the power distributor and the bus bars without separating the diverged circuit breakers by a predetermined distance more than the width of the main circuit breaker. The apparatus includes a main bus bar insulation member installed on the substrate and having a plurality of spaced-apart first insulation walls for electrically insulating the main bus bars by the phase of the AC voltage, and at least one bus bar insulation fixed on the substrate and having a plurality of spaced-apart second insulation walls for electrically insulating the bus bars and for being coupled onto the main bus bar insulation member.

6 Claims, 3 Drawing Sheets

BUS BAR INSULATION APPARATUS FOR ELECTRIC POWER DISTRIBUTION

BACKGROUND OF THE INVENTION

1. Field of the Invention

The present invention relates to a bus bar insulation apparatus for an electric power distributor, and in particular to an improved bus bar insulation apparatus for an electric power distributor which is capable of minimizing the size of an electric power distributor, effectively insulating bus bars of the same, and preventing an electric shock accident due to exposed bus bars during a maintenance of the electric power distributor.

2. Description of the Conventional Art

Generally, the electric power distributor is a device for distributing electric power to a plurality of electric load units and includes a main circuit breaker for switching a main power, a plurality of diverged circuit breakers for switching an electric power supply between the main circuit breaker and a plurality of electric load units, a plurality of main bus bars electrically connecting the main circuit breaker to the diverged circuit breakers and being made of a conductive material, and cables supplying the electric power from the diverged circuit breakers to the electric load elements. The thusly constituted electric power distributor is installed within a casing having a door with a locking device in order to prevent an electric shock accident when it is opened.

FIGS. 1 and 2 illustrate the conventional electric power distributor. In the drawings, a casing, an electric power cable, and an electric load-side cable are omitted for an easy understanding.

As shown in FIGS. 1 and 2, the conventional power distributor includes a substrate 100, a main circuit breaker 1 mounted on the substrate 100, three lengthy main bus bars 11 are electrically connected with the main circuit breaker 1 and are spaced-apart at a predetermined interval from each other, and a plurality of diverged circuit breakers which are parallely spaced-apart in two lanes at a predetermined distance t2 between opposed two diverged circuit breakers 2, which distance is longer than the width t1 of the main circuit breaker 1, and a plurality of diverged bus bars 21 which electrically contact with the main bus bars for supplying a three-phase alternating current voltage to the diverged circuit breakers 2.

The diverged bus bars 21 each include one end portion (not shown) connected with a power terminal (not shown) of a corresponding one of the diverged circuit breakers 2, a curved portion (not shown) which electrically contacts with a corresponding one of the main bus bar 11, and the other end portion (not shown) electrically connected with a power terminal (not shown) of a corresponding one of the opposed diverged circuit breakers 2.

In the mounting structure of a breaker for the conventional electric power distributor, in a state that the diverged circuit breakers 2 which are formed in two lanes are spaced apart by more than the distance (width) t1 of the main circuit breaker 1, since a predetermined distance is formed between the bus bars through which a three-phase alternating power is supplied, and the main bus bars 11 and the diverged bus bars 21 are installed, the electrically conducting portions are exposed to the outside, thus causing an electric chock during a maintenance work with respect to the electric power distributor or when changing the same. As the distance between the diverged circuit breakers, which are formed in two lanes, is increased, the size of the casing is increased, and as the number of the diverged circuit breakers 2 is increased, the size of the casing is increased thereby.

In addition, as the electrically conducting portions are exposed to the outside, a maintenance work or the like is executed in a state that the electric power is blocked from the main circuit breaker 1 with respect to the diverged circuit breakers 2 or the diverged bus bars 21, the electric lines, which do not need a maintenance, are blocked from the electric power supply, thus causing inconvenience.

Furthermore, in order to avoid the above-described problems, since much insulation materials are used, the electric power distributor is made bulky, and the fabrication cost is increased, and the fabrication process is complicated.

SUMMARY OF THE INVENTION

Accordingly, it is an object of the present invention to provide a bus bar insulation apparatus for an electric power distributor which overcomes the aforementioned problems encountered in the conventional art.

It is another object of the present invention to provide a bus bar insulation apparatus for a power distributor which is capable of effectively insulating the bus bars of the power distributor without separating the diverged circuit breakers by a predetermined distance more than the width of the main circuit breaker.

It is another object of the present invention to provide a bus bar insulation apparatus for a power distributor which is capable of preventing an electric shock due to an over-exposure of an electrically conducting portion when maintaining or changing the bus bars or the diverged circuit breakers of the electric power distributor and performing a predetermined work in a state that only a corresponding diverged circuit breaker is turned off, whereby it is possible to use the electric power lines which do not need to be turned off, thus efficiently using the electric power distributor.

It is another object of the present invention to provide a bus bar insulation apparatus for a power distributor which is capable of fabricating a small size casing, reducing the fabrication cost, and optimizing an installation space.

To achieve the above objects, there is provided a bus bar insulation apparatus for a power distributor which includes a main bus bar insulation member installed on the substrate and having a plurality of spaced-apart first insulation walls for electrically insulating the main bus bars by the phase of the AC voltage, and at least one bus bar insulation fixed on the substrate and having a plurality of spaced-apart second insulation walls for electrically insulating the bus bars and for being coupled onto the main bus bar insulation member.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
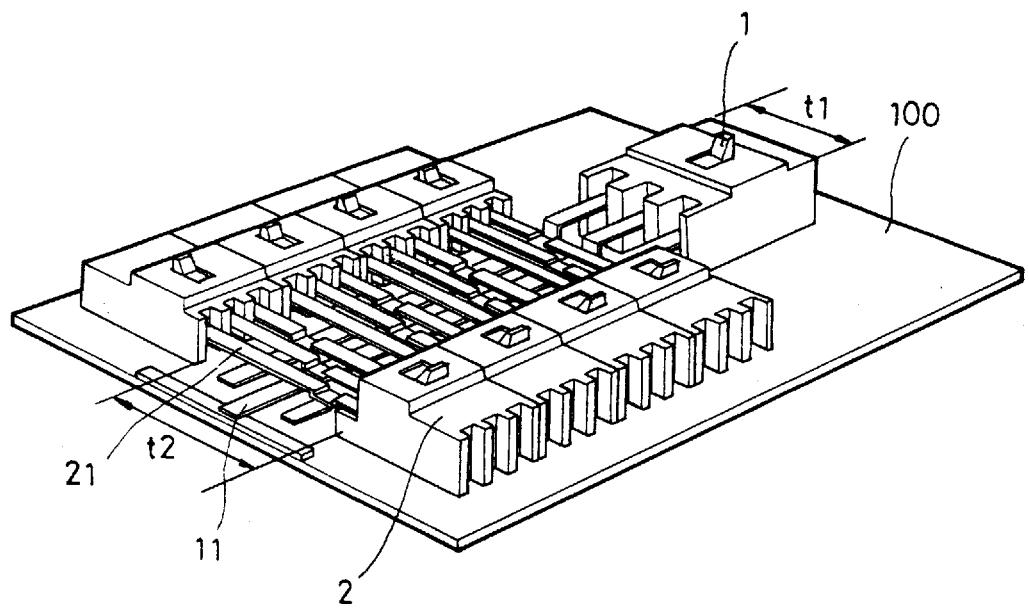
FIG. 1 is a perspective view illustrating a conventional power distributor.
Figure 2:
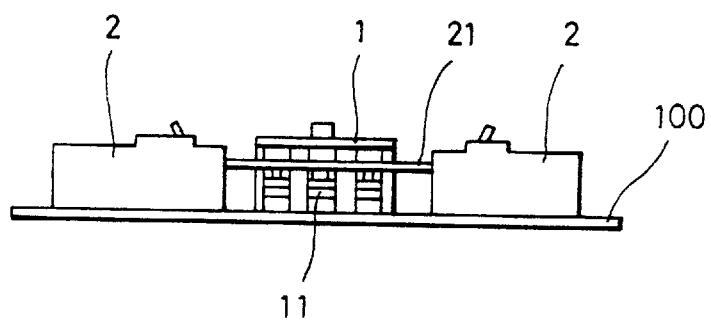
FIG. 2 is a front view illustrating a conventional power distributor.
Figure 3:
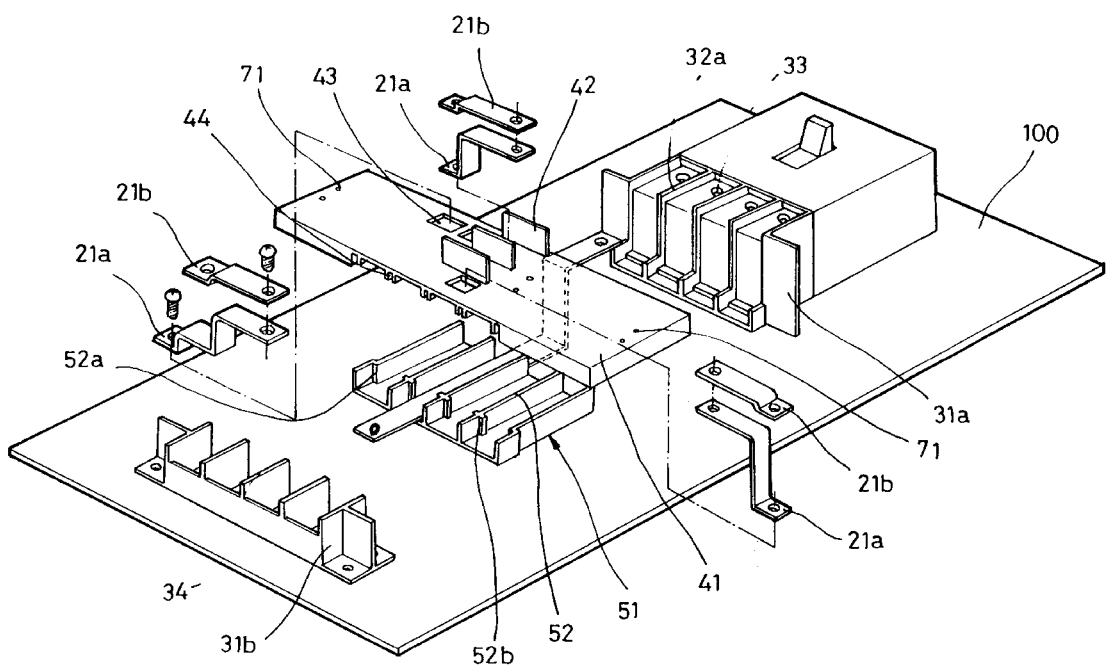
FIG. 3 is an exploded perspective view illustrating a power distributor according to the present invention.

FIG. 3 is an exploded perspective view illustrating a power distributor according to the present invention. As shown therein, the bus bar insulation apparatus according to the present invention includes a main bus bar insulation member 51 installed on the substrate 100 and having a plurality of spaced-apart first insulation walls 52 for electrically insulating main bus bars 11, and a diverged bus bar insulation member 41 engaged onto the main bus bar insulation member 51 and having a plurality of spaced-apart second insulation walls 42 formed on the upper surface thereof for electrically insulating the bus bars 21a and 21b, wherein the electric power distributor includes a substrate 100, a main circuit breaker 1 fixed to the substrate 100 and connected with a three-phase alternating current for supplying an electric power or blocking the same, three main bus bars 11 connected with the main circuit breaker 1 for supplying the three-phase electric power from the main circuit breaker 1 to the diverged circuit breakers 2 (described later), a plurality of diverged circuit breakers 2 each of which is connected with a corresponding electric load circuit and fixed to the substrate 100 for supplying the electric power to the electric load circuits or blocking the same therefrom, and bus bars 21a and 21b electrically connecting the main bus bars 11 and the diverged circuit breakers 2.

A plurality of channel-shaped grooves 44 are formed on the lower surface of the diverged bus bar insulation member 41 for receiving corresponding first insulation walls 52 when the main bus bar insulation member 51 and the diverged bus bar insulation member 41 are engaged.

The first insulation walls 52 each include step portions 52a and 52b for stopping the first insulation walls 52 of the diverged bus bar insulation member 41.

A plurality of holes 43 are formed on the upper surface of the diverged bus bar insulation member 41 for receiving a lower end of each of the bus bars 21a therethrough, so that the lower end of each of the bus bars 21a electrically contacts with a corresponding one of the main bus bars 11.

In addition, the bus bar insulation apparatus for an electric power distributor according to the present invention includes a first insulation terminal member 31a connecting an end portion of each of the main bus bars 11 to the main circuit breaker 1, and a second insulation terminal member 31b to which the other end of each of the main bus bars 11 is connected.

The fabrication and operation of the bus bar insulation apparatus for an electric power distributor according to the present invention will now be explained with reference to the accompanying drawings.

Figure 4:
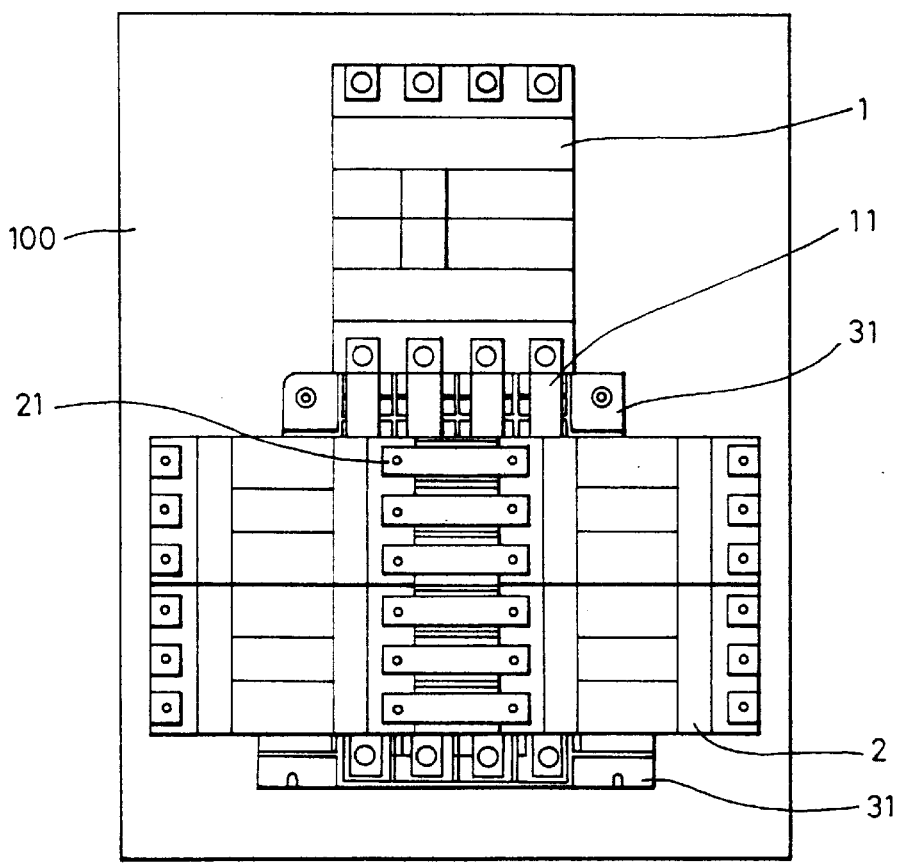
FIG. 4 is a plan view illustrating a power distributor according to the present invention.
Figure 5:
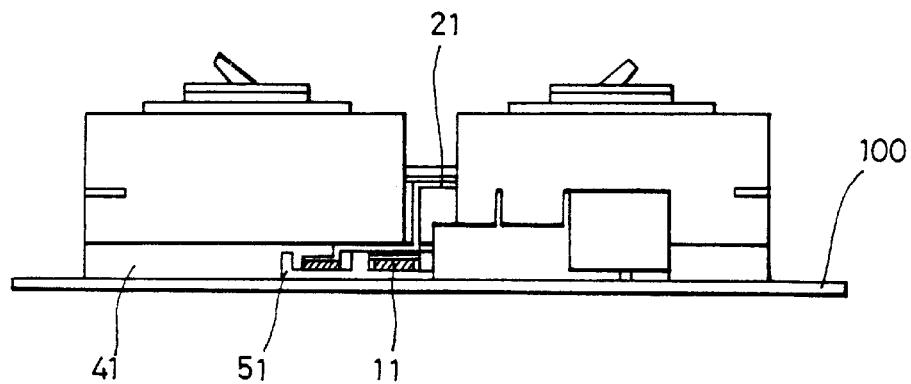
FIG. 5 is a front view illustrating a power distributor according to the present invention.

As shown in FIGS. 3 and 4, when fabricating the electric power distributor, the main circuit breaker 1 is fixedly mounted on the substrate 100, and terminal portions (not shown) formed in the main circuit breaker 1 are aligned, and the first insulation terminal member 31a is fixedly engaged to the main circuit breaker 1. At this time, the hole 33 formed in each of the terminal portions of the first insulation terminal member 31a and a hole (not shown) formed in each of the terminal portions (not shown) of the main circuit breaker 1 are aligned, thus engaging the first insulation terminal member 31a and the main circuit breaker 1. In the case that a three-phase alternating current voltage is supplied to the first insulation terminal member 31a, at least four insulation walls 32a are integrally formed, so that at least three main bus bar guide paths are formed by the first insulation walls 52 of the main bus insulation member 51.

Protrusions 52a and 52b are formed on the first insulation walls 52, so that the engaging position thereof is determined on the first insulation wall 52 of the diverged bus bar insulation member 41.

Next, the three main bus bars 11 are installed on the main bus bar guide paths formed by the first insulation walls 52 of the main bus bar insulation member 51, and an electric power-source connection portion of each of the main bus bars 11 is installed on the guide path formed by the insulation walls 32a of the first insulation terminal member 31a.

In a state that the holes 33 of the first insulation terminal member 31a are matched with the holes (not shown) formed in the terminal portions (not shown) of the main circuit breaker 1, the terminal connection holes formed on the main bus bars 11 are aligned with the thusly matched holes, thus engaging the same using screws, whereby the terminal portions (not shown) of the main circuit breaker 1 and the electric-power connection terminals of the main bus bars 11 are connected.

In addition, the other end portions of the three main bus bars 11 are inserted into the guide paths formed by the insulation walls 32b of the second insulation terminal member 31b which is spaced-apart from the first insulation terminal member 31a of the substrate 100, and the screw holes (not shown) formed in each of the other end portions of the main bus bars is aligned with the terminal hole (not shown) formed in each terminal of the second insulation terminal member 31b, thus engaging the same using screws.

The length of the diverged bus bar insulation member 41 is longer than the length that the guide path widths of the main bus bar insulation member 51 are summed is summed by the combined length of two diverged circuit breakers 2.

The width of the diverged bus bar insulation member 41 is made to be identical with the length of the guide path of the main bus bar insulation member 51 or to be smaller than the same. The thickness of the same is similar to the height of the insulation wall 52 of the main bus bar insulation member 51. Channel-shaped grooves 44 are formed on the lower surface of the diverged bus bar insulation member 41 for supportedly receiving the first insulation walls 52 of the main bus bar insulation member 51 thereinto, and the height of the channel-shaped protrusions 44 are smaller than the heights of the first insulation walls 52, and the channel-shaped protrusions 44 are formed to be extended up to the protrusions 52a and 52b of the guide paths of the main bus bar insulation member 51.

Three second insulation walls 42 are installed on the central upper surface of the diverged bus bar insulation member 41 for electrically insulating the upper bus bars 21b, and the lengths of the second insulation walls 42 are the same as the length of the longer length with respect to the curved portion of the upper bus bar 21b. Three through holes 43 are formed in the bus bar guide paths formed by the second insulation walls 42 on the upper surface of the diverged bus bar insulation member 41 in order for the lower bus bars 21a to pass therethrough.

The first insulation walls 52 are received into the channel-shaped grooves 44 of the diverged bus bar insulation member 41, and the diverged bus bar insulation member 41 is engaged onto the main bus bar insulation member 51.

The lower portions of the lower bus bars 21b are placed to be closer to the main bus bars 11 using screws and then the lower bus bars 21b are fixed thereto. Thereafter, the upper portions thereof are extended from the upper portion of the diverged bus bar insulation member 41 through the holes 43, and then the hole formed in the upper portion is aligned with the terminal hole (not shown) of the diverged circuit breaker 2. One end portion of the upper bus bar 21b is connected with the terminal (not shown) of the diverged circuit breaker 2 using a screw, and the other end portion of the same is connected to the terminal (not shown) of another diverged circuit breaker 2 which is installed opposedly from the diverged circuit breaker 2.

The diverged circuit breakers 2 are fixed to the diverged bus bar insulation member 41 by the screws which are threaded into the diverged circuit breaker engaging holes 71 which are formed in pair for each diverged circuit breaker 2.

As described above, in the bus bar insulation apparatus for an electric power distributor according to the present invention, it is possible to insulate the bus bars of the electric power distributor by using the insulation walls 52 and 42 formed in the main and diverged bus bar insulation members 51 and 41 of the bus bars 11 and 21 without separating the diverged circuit breakers 2 which are formed in two lanes by a predetermined distance more than the width of the main circuit breaker 1, so that it is possible to prevent an electric shock due to the exposed electric portions during the maintenance of the diverged circuit breakers of the electric power distributor or the changes thereof. In addition, in a state that only a corresponding diverged circuit breaker is turned off, a maintenance work or the like is available without turning off the main circuit breaker.

Furthermore, since a plurality of insulation walls 52 and 42 are integrally formed in the main bus bar insulation member 51 and the diverged bus bar insulation member 41, respectively, it is possible to fabricate a compact size electric power distributor, thus reducing the fabrication cost and the installation space and simplifying the fabrication process.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. In an electric power distributor including a substrate, a main circuit breaker fixed onto the substrate and connected with a three-phase alternating current (AC) voltage source for supplying or blocking the same, at least three main bus bars each connected to the main circuit breaker for supplying the three-phase alternating current (AC) therethrough, a plurality of diverged circuit breakers fixed on the substrate and each connected to a predetermined electric load circuit for supplying or blocking the electric current from the main circuit breaker, and a plurality of diverged bus bars for electrically connecting the diverged circuit breakers to the main bus bars, a bus bar insulation apparatus for said electric distributor, comprising:

a main bus bar insulation member installed on the substrate and having a plurality of spaced-apart first insulation walls for electrically insulating the main bus bars; and at least one diverged bus bar insulation member fixed on the substrate and having a plurality of spaced-apart second insulation walls for electrically insulating the diverged bus bars and for being coupled onto the main bus bar insulation member.

2. The apparatus of claim 1, wherein a plurality of channel-shaped grooves are formed on the lower surface of the diverged bus bar insulation member for receiving the first insulation walls when the bus bar insulation member is coupled onto the main bus bar insulation member.

3. The apparatus of claim 1, wherein said first insulation walls each include a protrusion for determining a coupling position of the diverged bus bar insulation member.

4. The apparatus of claim 2, wherein said first insulation walls each includes a protrusion for determining a coupling position of the bus bar insulation member.

5. The apparatus of claim 1, wherein a plurality of holes are formed on the upper surface of the diverged bus bar insulation member so that one end of each of the diverged bus bars is inserted into a corresponding one of the holes, thus electrically contacting with a corresponding one of the main bus bars.

6. The apparatus of claim 1, further comprising:

a first insulation terminal portion for electrically connecting an one end of each of the main bus bars to the circuit breaker; and a second insulation terminal portion for fixing the other end of each of the main bus bars.

* * * * *